E. Duffee,
Pipe Coupling,

Nº 59,982.　　　　　　　　Patented Nov. 27, 1866.

Witnesses:
Samuel N. Piper
H. Coates

Inventor:
Edward Duffee.
by his Attorney
R. White

United States Patent Office.

IMPROVEMENT IN PIPE COUPLINGS.

EDWARD DUFFEE, OF HAVERHILL, MASSACHUSETTS, ASSIGNOR TO HIMSELF AND GEORGE APPLETON, OF SAME PLACE.

*Letters Patent No. 59,982, dated November 27, 1866.*

SPECIFICATION.

TO ALL PERSONS TO WHOM THESE PRESENTS SHALL COME:

Be it known that I, EDWARD DUFFEE, of Haverhill, in the county of Essex, and State of Massachusetts, have invented a new and useful Improvement in Pipe Joints; and do hereby declare the same to be fully described in the following specification, and represented in the accompanying drawings, of which—

Figure 1:
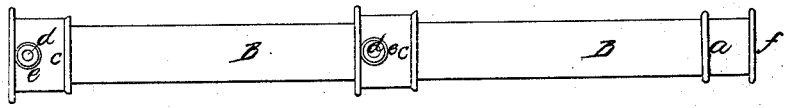
Figure 1 is an external view.
Figure 2:
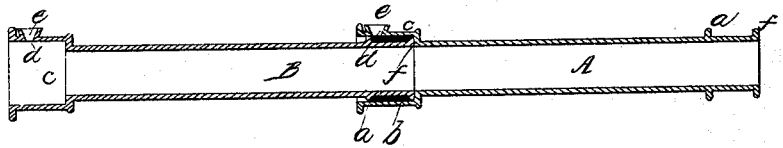
Figure 2 is a longitudinal section of two pipes connected by my improved joint.
Figure 3:
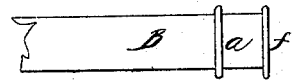
Figure 3 is a side view of the male part of the joint.

The improved joint is specially designed for gas or water pipes.

In the drawings, A and B are two pipes formed with and connected by such joint, which is like a common and well-known water-pipe joint, with the addition not only of a filling opening, $d$, but of a stopping-flange, $a$; the latter projecting from and going around the pipe B, and being arranged to enter the mouth of the socket-head, $c$, of the pipe, A, and so as to stop the cement-receiving space, $b$, which circumscribes the pipe, B, and is included between it and the socket part, $c$, of the pipe, A. The opening, $d$, may be provided with a tunnel or mouth, $e$. The pipe, B, at its end which enters the socket-head, $c$, is to have a flange, $f$, going around it. Each pipe is to be constructed with a socket-head, $c$, at one end, and with flanges, $a$ $f$, at its other end, the socket-head being formed and the flanges being arranged with respect to each other as represented in the drawings. The annular space, $b$, between the pipes, and within the joint after one pipe may have been introduced into the other, is to be filled with cement which may be poured into or through the hole, $d$. A joint so made will be much stronger than the common joint, which is like the improved joint except in having the filling-hole, $d$, and the additional flange, $a$. The said flange, $a$, by its co-operation with the flange, $f$, serves to support the two pipes or prevent them from sagging and breaking or injuring the cement.

What I claim, is the new or improved pipe joint, consisting of the opening $d$, and the auxiliary flange $a$, the main flange $f$, and the socket-head $c$, arranged and applied to the pipes A and B, as set forth.

EDWARD DUFFEE.

Witnesses:
R. H. EDDY,
F. P. HALE, Jr.